United States Patent [19]

Wagar

[11] 4,043,824

[45] Aug. 23, 1977

[54] CERAMIC COLOR COMPOSITIONS AND A METHOD FOR DECORATING CERAMIC WARE THEREWITH

[75] Inventor: Nelson William Wagar, Pittsburgh, Pa.

[73] Assignee: Hercules Incorporated, Wilmington, Del.

[21] Appl. No.: 601,738

[22] Filed: Aug. 4, 1975

[51] Int. Cl.² .............................................. C03C 5/02
[52] U.S. Cl. ........................................ 106/48; 106/52;
 106/288 Q; 428/325; 428/384; 427/193;
 427/203; 427/204; 427/205; 106/308 Q
[58] Field of Search ............... 106/308, 288 Q, 48,
 106/52; 427/193, 203, 204, 205; 428/325, 384

[56] References Cited

U.S. PATENT DOCUMENTS

| | | | |
|---|---|---|---|
| 2,720,461 | 10/1955 | Voet | 106/30 |
| 3,037,872 | 6/1962 | Varron | 106/30 |
| 3,072,577 | 1/1963 | Miller et al. | 106/30 |
| 3,383,344 | 5/1968 | Gill | 106/48 |

*Primary Examiner*—Patrick P. Garvin
*Assistant Examiner*—J. V. Howard
*Attorney, Agent, or Firm*—Hazel L. Deming

[57] ABSTRACT

Ceramic color compositions which are moisture or steam settable are described. The compositions are formulated from a dispersion of ceramic pigments or glass colors in certain moisture or steam set type vehicles and can be applied to green or bisque ceramic ware using standard decorating techniques and then set to a coating by exposure to moisture or steam. Over-glazing of the coating provides decoratively glazed ware of excellent quality and durability.

4 Claims, No Drawings

CERAMIC COLOR COMPOSITIONS AND A METHOD FOR DECORATING CERAMIC WARE THEREWITH

This invention relates to ceramic color compositions, to a method for decorating non-glazed ceramic ware with the composition and to ceramic ware decorated with a coating derived from the composition. More particularly, the invention relates to ceramic color compositions which are moisture or steam settable and which can be applied to non-glazed ceramic ware, moisture or steam set thereon and then top-coated with a glazing base and fired to fuse the coating and provide durable decorative glazes on the ceramic ware.

Enamels or glazes are conventionally produced on ceramic ware by applying a paste of vitrifiable frit base constituents in a volatile vehicle such as oil, kerosene or pine oil to bisque ware, drying the paste on the ware and then firing the ware to fuse the frit. The paste must have sufficient fluidity to permit ready application to the ware, must contain or act as a temporary film former to hold the coating in place until it is fused, and must contain a vehicle which is volatilizable at a temperature below the fusion temperature of the vitrifiable constituents. Additionally, the vehicle should be nonreactive with coloring agents or pigments therein, should not affect the hue or tint intended in the final glaze and should not produce any appreciable carbonaceous residue or blistering in the glaze.

Although pastes generally meeting the foregoing requirements are available, they are subject to the disadvantage that a drying operation, usually at elevated temperature, must be carried out to set the paste as a coating on the ware before the ware can be fired. The drying requirement is particularly time consuming when more than one coating is to be applied and adds considerably to expense since heat and additional equipment are usually necessary.

One approach which has been suggested to eliminate the drying requirement is to use a glaze formulated with a thermofluid type vehicle. Such vehicles are solid at normal room temperature, but melt when heated to a moderately elevated temperature. Glazes prepared with the thermofluid vehicles are applied to the article at above the molten temperature of the vehicle and harden upon cooling. Thus, by the proper correlation of melting temperature with the temperature of the article, glazes can be designed to harden in specified periods of time ranging from substantially immediately on contact with the article up to several minutes or more. Glazes prepared with thermofluid vehicles offer considerable economies over the earlier pastes and perform satisfactorily in manual coating systems. However, when automatic equipment is used, the higher temperatures and viscosity controls necessary for high speed operation offset any economic advantages realized over the paste vehicles.

In the printing ink field, inks have been formulated from pigment dispersed in a liquid vehicle which is a solution of a water-insoluble binder such as a rosin-modified maleic or fumaric resin in a water-miscible solvent such as glycol. When inks of this type — the so-called steam or moisture set inks — are applied to paper and subjected to steam or water, the binder precipitates out of solution and the liberated solvent is absorbed into the fibers of the paper leaving a film of the ink on the surface of the paper. The moisture set inks provide rapid setting matt finishes on paper or similar absorbent material but are not suitable for gloss printing or for use on nonporous surfaces. Rub resistance of the finish is poor and color selection is limited due to the powerful nature of the solvent on sensitive pigments. Steam or moisture set printing inks do not adhere to nonporous substrates such as glazed ware and are not suitable for use on any ware which must be fired due to the thermal instability of the pigments and the presence of constituents which leave undesirable residues at firing temperatures.

Now in accordance with this invention, it has been found that color compositions formulated from a dispersion of ceramic pigments or glass colors in certain moisture or steam set type vehicles can be applied to non-glazed ceramic ware using standard decorating techniques, rapidly set thereon by exposure to moisture or steam, top-coated with a glazing base conventionally and then fired to provide decoratively glazed ware of excellent quality and durability. By the term non-glazed ceramic ware is meant a ceramic base such as green (non-fired) or bisque (fired) ceramic ware or green or bisque ceramic ware which has been coated with a glazing base but has not been fired to fuse the glaze and form an enameled or glazed surface on the ware. The rapid setting capabilities of the composition provide outstanding economies in processing steps, energy requirements and in-process inventories as well as improved ease of handling during processing, particularly when multi-color or multi-tone effects are desired in complex designs.

Accordingly, the present invention relates to a ceramic color composition comprising an intimate dispersion of at least a coloring amount of ceramic pigment or glass color in a moisture or steam settable, liquid vehicle consisting essentially of a solution of at least one water-insoluble film-forming resin in a water-miscible solvent therefor, said vehicle being volatilizable without leaving objectionable residue thereof at a temperature below the decomposition temperature of the ceramic pigment and below the fusion temperature of the glass color, and the amount of resin in said vehicle being such that when the composition is applied to non-glazed ceramic ware and exposed to moisture or steam, a film of the resin is precipitated from the solvent onto the ware. The invention also relates to non-glazed ceramic ware having on at least a portion of its surface at least one moisture or steam set coating derived from the color composition of this invention, and to a method for decorating non-glazed ceramic ware comprising the steps of (1) applying the color composition of this invention to at least a portion of the surface of the ware in a decorative manner, (2) moisture or steam setting the composition on the ware, (3) applying at least one top coating of glazing base to the decorated ware, and (4) firing the top-coated ware at above the fusion temperature of the glazing base, steps (1) and (2) being repeated in sequence one or more times, if desired, prior to step (3).

The composition of this invention is, as stated, a ceramic color. By ceramic color is meant a color designed for application to a ceramic base by conventional techniques used in the ceramic industry such as, for example, by silk or metal screen stencil processes, offset-litho processes, letterpress processes, liquid or powder-spray processes, and the like. The color constituent of the composition is a ceramic pigment or a glass color. The term ceramic pigment as used herein refers to the inorganic oxides or calcined type pigments which are conventional to the ceramic industry, and which have been formulated to meet specific requirements such as heat stability, acid and/or alkali resistance, and the like. The term glass color as used herein refers to a vitrifiable frit containing one or more ceramic pigments as coloring agent fused into the frit or as a mill addition thereto. The glass colors customarily employed for ceramic applications generally comprise from about 1 to about 30%, and preferably from about 5 to about 20% of at least one ceramic pigment and from about 99 to about 70%, and preferably from about 95 to about 80% of finely-divided ceramic, enamel or glass frit constituents, and preferably a finely-divided lead borosilicate glass frit containing small percentages of refractory oxides to promote durability.

The amount of ceramic pigment or glass color in the color compositions of the invention can vary within relatively wide limits and the amount used for a given composition will depend at least in part upon such considerations as the particular pigment or color selected, rheological requirements of the composition and setting times desired. Generally, the proportion of pigment or color to vehicle will range from about 1:1 to about 6:1, and preferably from about 1.3:1 to about 3.5:1.

The vehicle for the ceramic pigment or glass color is a volatilizable liquid of the moisture or steam setting type. Vehicles of this type are known to the printing ink art and comprise a solution of a water-insoluble film-forming resin in a water-miscible solvent therefor. Typical moisture or steam setting vehicles are described in such U.S. Pat. Nos. as 2,244,103; 2,300,881; 2,346,968; 2,346,969; 2,390,102; 2,404,680; 2,513,122; 2,540,776; 2,597,903; 2,678,278; 2,720,461; 2,733,155; and 3,037,872; and in *Printing Ink Technology* by E. A. Apps, Chapter 23, pages 378 to 384, Chemical Publishing Co., Inc., New York, N.Y. (1959). Particularly preferred are those vehicles containing from about 15 to about 60 and most preferably from about 20 to about 50 weight % of alcohol-soluble resins derived from rosin, a rosin derivative or a terpene hydrocarbon and an $\alpha,\beta$-unsaturated polycarboxylic acid such as maleic or fumaric acid; salts or derivatives such as the esters thereof; the petroleum hydrocarbon-insoluble resins derived from wood rosin; shellac (natural or synthetic); shellac derivatives; combinations of beta-naphthol pitch or lignin pitch with a rosin such as gum rosin, wood rosin or the petroleum hydrocarbon-insoluble resins derived from wood rosin; limed rosin; zincated rosin; alkyd resins; phenol, urea or melamine aldehyde, particularly formaldehyde, resins; and copolymers of a vinyl compound such as styrene and a hydroxyalkyl ester of an $\alpha,\beta$-unsaturated polycarboxylic acid. Particularly preferred are the resins derived from rosin and unsaturated acids or anhydrides such as maleic acid, maleic anhydride or fumaric acid and esterified with a polyhydric alcohol such as diethylene glycol or pentaerythritol to provide a resin having an acid value of at least about 50 and preferably from about 80 to about 350. Such resins (or rosin esters as they are sometimes called) are commercially available under the trade designations Unirez 710, Lawter 1515, Shanco 60-58, FRP Co. F-591, Arochem 402, 404, 450 and 455, Dymerex and Pentalyn 255. Also preferred are the petroleum hydrocarbon-insoluble resins derived from wood rosin, as for example, those commercially available as the Vinsol resins.

Preferred solvents which form the liquid portion of the vehicle are the water-miscible alcohols and the water-miscible ethers and ester derivatives of polyhydric alcohols containing at least one free hydroxyl group. Particularly preferred are the lower alkanols and the glycols, glycerols, glycol ethers, glycol esters and glycerol esters containing 2 to 8 carbon atoms. Representative solvents of the above types include methanol, ethanol, propanol, ethylene glycol, diethylene glycol, triethylene glycol, propylene glycol, dipropylene glycol, butylene glycol-1,2, hexylene glycol, glycerol, monobutyl ether of ethylene glycol, monomethyl ether of ethylene glycol, monoethyl ether of ethylene glycol, monomethyl ether of diethylene glycol, monoethyl ether of diethylene glycol, monobutyl ether of diethylene glycol, monoacetin, diacetin, and mixtures thereof. Small amounts, as for example, up to about 20% of the solvent, can be replaced by the higher glycols, glycol ethers and/or glycol esters such as hexyl cellosolve or hexyl carbitol to improve workability, increase water sensitivity, modify resin solubility, etc., if desired.

The vehicle can also contain small amounts up to about 10% or more of other resinous or film-forming ingredients of limited solubility in water and the solvent to modify certain characteristics of the moisture or steam set film such as scuff or mar resistance, tackiness, drying speed, etc., provided they do not detract from the advantages of the invention. Specific ingredients such as up to about 10% of zein, up to about 5% of nitrocellulose and up to about 5% of ethyl cellulose have been found to be particularly useful.

The color compositions of the invention can be compounded in any convenient manner for forming an intimate dispersion of particulate material in a liquid vehicle, as for example, by mixing, mulling, three roll milling and the like. The resulting dispersions can be applied to green or bisque ware conventionally, as through a screen stencil by means of a squeeze press to a portion of the surface of the ware, by stamping, by offset-litho processes or by spraying, particularly when application to the entire surface of the ware is desired. Following application of the color composition to the bisque or green ware the composition is moisture or steam set, as for example, by exposing the coated ware to a spray of water or a jet of steam. A plurality of moisture or steam set coatings in any color, design or registry can be applied in the above manner by overprinting with the same or different color compositions and then moisture setting each coating in turn as above prior to the application of a subsequent coating. Following moisture or steam setting of single or multiple coatings on the ware, a conventional glazing base is applied to the decorated ware as a single or plurality of top coatings and the topcoated ware is fired at a temperature which will fuse the glazing base particles and form a glassy or glazed surface on the ware. Any of the usual glazing base formulations designed for glazing ceramic ware can be utilized as the top coating medium. Particularly useful are aqueous dispersions of fritted or nonfritted lead borosilicate glazing bases. Such glazing bases fuse at above about 510° C. and can be fired conveniently at from temperatures ranging from about 510° to about 1200° C.

Ceramic ware which has been decorated with the composition of this invention and overglazed possesses a clear, sharp design free of irregularities, running marks or sagging and the finish is a glassy impermeable surface free of blisters, pits or other imperfections.

The invention is further illustrated by the following examples in which all parts and percentages are by weight unless otherwise indicated.

EXAMPLE 1

A steam set vehicle was prepared by dissolving 220 parts of a maleic-modified pentaerythritol ester of rosin having an acid value of 80-90 and a drop softening point range of 135°-145° C. (Arochem 455) in 258 parts of ethylene glycol at 92° C. An amount equal to 78 parts of the above vehicle was mixed with 255 parts of a glass color composed of a fritted mixture of 90% of a lead borosilicate glass, 9% of cobalt oxide blue and 1% of zinc oxide (particle size substantially finer than the decorating screen) by milling on a three roll mill until a homogeneous paste-like mixture was formed. The resulting color was applied as a decorative coating onto one surface of a bisque tile by screen printing and the decoration was set thereon by exposing the applied color to a jet of steam. The resulting decorated tile was immediately passed first to a glazing station where a commercial aqueous glazing base was sprayed onto the tile and then to a furnace wherein the tile was fired at 980° C. for 60 minutes. The fired tile, following cooling, had a glossy surface decoration in a clear, sharp dark blue design free of irregularities, running marks and sagging. The glossy finish was free of surface defects and had excellent durability.

When the above procedure was repeated except that an equal amount of diethylene glycol, propylene glycol or dipropylene glycol was substituted for the ethylene glycol, the glazed decorated tiles were of excellent quality and durability and there was no evidence of imperfections in the glazed surface.

EXAMPLE 2

The procedure of Example 1 was repeated except that 220 parts of a maleic-modified pentaerythritol ester of rosin having an acid value of 210-235 and a melting point of 130°-140° C. (Arochem 402) were substituted for the Arochem 455, 102 parts of the vehicle were mixed with 255 parts of a turquoise blue ceramic pigment composed of zirconium, vanadium and silicon oxides, and the color was applied to bisque dinner plates. The decoration on plates was sharp and free of run or sag lines. The glazed plates were of excellent quality and durability.

EXAMPLE 3

The procedure of Example 2 was repeated except that 220 parts of a dark brown petroleum hydrocarbon-insoluble resin derived from wood rosin (Vinsol, flake form) having an acid value of 95 and a softening point of 125° C. were substituted for the Arochem 402 and 150 parts of the vehicle were mixed with 255 parts of the ceramic pigment. Glazed dinner plates having a sharp, bright turquoise decoration thereon were obtained.

EXAMPLE 4

The procedure of Example 2 was repeated except that a mixture of 88 parts of Arochem 402 and 132 parts of Arochem 455 were substituted for the 220 parts of Arochem 402 and 73 parts of the vehicle were mixed with 255 parts of the glass color of Example 1. The glazed decorated plates were of excellent quality and durability.

EXAMPLE 5

The procedure of Example 3 was repeated except that the vehicle also contained 11 parts of nitrocellulose of the alcohol soluble type (RS Nitrocellulose, nitrogen content 11.8 to 12.0%, 30-40 second viscosity type). Decorated dinner plates of excellent scuff resistance were obtained. The glazed plates were of excellent quality and durability.

EXAMPLE 6

The procedure of Example 1 was repeated except that a mixture of 59.5 parts of ethylene glycol, 129 parts of diethylene glycol, 64.5 parts of propylene glycol and 5 parts of n-hexyl cellosolve were substituted for the 258 parts of ethylene glycol. The glazed tiles were comparable to the tiles of Example 1.

What I claim and desire to protect by Letters Patent is:

1. A ceramic color composition comprising an intimate dispersion of from about 1 to about 6 parts of a ceramic pigment or a glass color in 1 part of a moisture or steam settable, liquid vehicle consisting essentially of a solution of at least one water-insoluble film-forming resin in a water-miscible solvent therefor, said vehicle being volatilizable without leaving objectionable residue thereof at a temperature below the decomposition temperature of the ceramic pigment and below the fusion temperature of the glass color, and the amount of resin in said vehicle ranging from about 15 to about 60% of the weight of said vehicle and being such that when the composition is applied to non-glazed ceramic ware and exposed to moisture or steam, a film of the resin is precipitated from the solvent onto the ware.

2. The composition of claim 1 wherein the film-forming resin is a rosin ester having an acid number of at least about 50 and the solvent comprises at least one glycol.

3. The composition of claim 2 wherein at least one glycol is ethylene glycol.

4. The composition of claim 1 wherein the film-forming resin is a petroleum hydrocarbon-insoluble resin derived from wood rosin and the solvent is ethylene glycol.

* * * * *